US012780047B2

(12) United States Patent
Line et al.

(10) Patent No.: US 12,780,047 B2
(45) Date of Patent: Nov. 3, 2026

(54) VEHICLE SEATING ASSEMBLY

(71) Applicant: Ford Global Technologies, LLC, Dearborn, MI (US)

(72) Inventors: Johnathan Andrew Line, Northville, MI (US); Jose Maria Aburto, Oaxtepec (MX); Javier Antonio Aguilar, Tultitlan (MX); Antonio Martinez Ilescas, Toluca (MX); Chuck R. Reese, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 18/790,048

(22) Filed: Jul. 31, 2024

(65) Prior Publication Data

US 2026/0034918 A1 Feb. 5, 2026

(51) Int. Cl.
*B60N 2/02* (2006.01)
*B60N 2/30* (2006.01)

(52) U.S. Cl.
CPC ............... *B60N 2/02* (2013.01); *B60N 2/305* (2013.01); *B60N 2/309* (2013.01)

(58) Field of Classification Search
CPC ........ B60N 2/02; B60N 2/3047; B60N 2/305; B60N 2/3077; B60N 2/309
USPC .......................................................... 297/334
See application file for complete search history.

(56) References Cited

U.S. PATENT DOCUMENTS

| | | | | |
|---|---|---|---|---|
| 5,564,780 A | 10/1996 | Presser et al. | | |
| 6,962,384 B2 | 11/2005 | Rhodes et al. | | |
| 7,753,429 B2 | 7/2010 | Villeminey | | |
| 8,882,197 B2 * | 11/2014 | Line | B60N 2/3031 | 297/331 |
| 2014/0167466 A1 * | 6/2014 | Line | B60N 2/3093 | 297/340 |
| 2022/0161696 A1 | 5/2022 | Agalave et al. | | |

FOREIGN PATENT DOCUMENTS

DE 102015223221 A1 * 6/2016 ........... B60N 2/3013

* cited by examiner

*Primary Examiner* — Milton Nelson, Jr.
(74) *Attorney, Agent, or Firm* — Vichit Chea; Price Heneveld LLP

(57) ABSTRACT

A seating assembly for a vehicle including a seat base frame including a front portion and a rear portion. A linking member rotatably coupled with the seat base frame and configured to pivotably rotate about the seating assembly. At least one bin assembly operable between a deployed state and a stowed state. The at least one bin assembly including a first bin portion including first opposing side links. A second bin portion includes second opposing side links, where the first opposing side links are operably coupled to the second opposing side links. A connector link operably coupled to the second opposing side links of the second bin portion.

13 Claims, 10 Drawing Sheets

VEHICLE SEATING ASSEMBLY

FIELD OF THE DISCLOSURE

The present disclosure generally relates to a vehicle seating assembly, and more specifically to a linkage assembly for a vehicle seating assembly.

BACKGROUND OF THE DISCLOSURE

Vehicle seating assemblies often need to be durable to increase occupant comfort and placement. Vehicle seating assemblies also need to be compactable to provide additional uses for space within the vehicle. This may be accommodated by the linkage assembly to fold the vehicle seating assembly.

SUMMARY OF THE DISCLOSURE

According to one aspect of the present disclosure, a seating assembly for a vehicle includes a seat base including a seat base frame, the seat base frame includes a front portion and a rear portion, at least one linkage assembly rotatably coupled to a bar assembly and operable between a deployed state and a stowed state, the at least one linkage assembly includes a first linking portion including first opposing side links, a second linking portion including second opposing side links, the first opposing side links are operably coupled to the second opposing side links, a linking member operably coupled to the bar assembly, wherein the linking member is configured to rotate about the bar assembly, a connector link operably coupled to the second opposing side links of the second linking portion.

Embodiments of the first aspect of the present disclosure can include any one or a combination of the following features:

- a support structure extending along a floor of the vehicle, wherein a surface of the second opposing side links of the second linking portion are configured to abut the support structure when the at least one linkage assembly is in the deployed state;
- the first opposing side links include a first end and a second end, and wherein the second opposing side links include a first end and a second end;
- the second end of the first opposing side links are operably coupled to the first end of the second opposing side links;
- the first end of the first opposing side links is coupled to the front portion of the seat base frame;
- the bar assembly includes a first bar, a second bar, and a third bar;
- the linking member includes a first end coupled to the first bar and a second end coupled to the third bar of the bar assembly, and wherein the linking member is configured to rotate about the third bar when the at least one linkage assembly is in the stowed state;
- the connector link includes a first end and a second end, and wherein the first end of the connector link is operably coupled to the second bar and the second end of the connector link is coupled to the third bar;
- the second end of the connector link abuts the second end of the second opposing side links of the second linking portion;
- the at least one linkage assembly includes a first retention member extending between the first opposing side links and a second retention member extending between the second opposing side links configured to reinforce the at least one linkage assembly;
- the second opposing side links include an extension portion defining an aperture; and
- a pin extends through the aperture of the extension portion of the second opposing side links of the second linking portion.

According to another aspect of the present disclosure, a seating assembly for a vehicle includes a vehicle body, a base including a seat base frame operably coupled to the vehicle body, a bar assembly including a first bar and a second bar, a linkage assembly operably coupled to the bar assembly, the linkage assembly including a first linking portion including first opposing side links, a second linking portion including second opposing side links, wherein the first opposing side links are operably coupled to the second opposing side links, a connector link operably coupled to the second opposing side links of the second linking portion, and a linking member including a first end and a second end, wherein the first end is coupled to the first bar and the second end is coupled to the second bar of the bar assembly Embodiments of the second aspect of the present disclosure can include any one or a combination of the following features:

- the linkage assembly is operable between a deployed state and a stowed state;
- a support structure extending along a floor of the vehicle body, wherein a surface of the second opposing side links of the second linking portion are configured to abut the support structure when the linkage assembly is in the deployed state; and
- a connector link operably coupled to the second opposing side links of the second linking portion.

According to another aspect of the present disclosure, a seating assembly for a vehicle includes a seat base, at least one linkage assembly operably coupled to a bar assembly, where the at least one linkage assembly is operable between a deployed state and a stowed state, the at least one linkage assembly including a first linking portion including first opposing side links, a second linking portion including second opposing side links, the first opposing side links operably coupled to the second opposing side links at an engagement point, and a pin extending through an aperture defined at the engagement point of the first linking portion and the second linking portion.

Embodiments of the third aspect of the present disclosure can include any one or a combination of the following features:

- a linking member operably coupled to the bar assembly configured to rotate about the bar assembly;
- the at least one linkage assembly includes a first retention member extending between the first opposing side links and a second retention member extending between the second opposing side links configured to reinforce the at least one linkage assembly; and
- a connector link operably coupled to the second opposing side links of the second linking portion.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
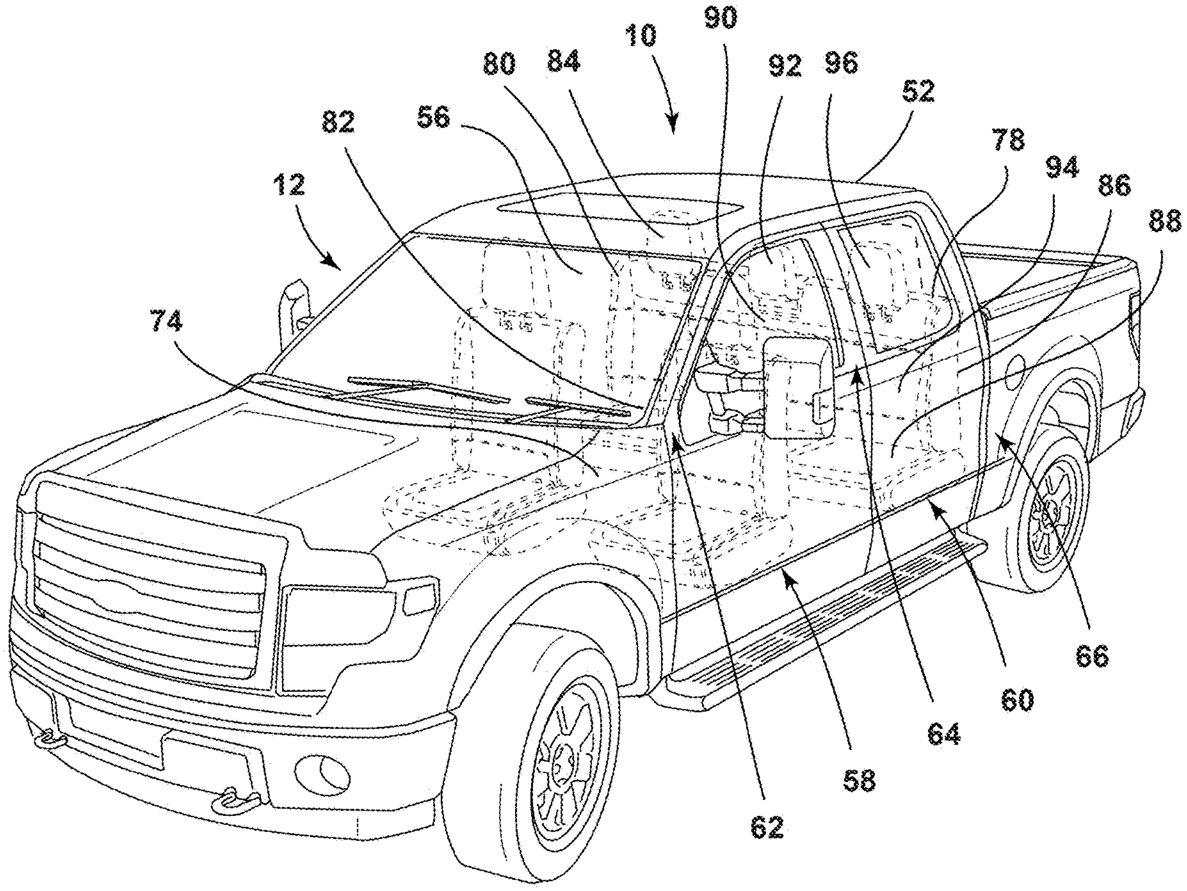
FIG. 1 is a side perspective view of a vehicle including a seating assembly constructed, according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-11, a seating assembly is generally designated at 10. In general, the seating assembly 10 for a vehicle 12 can provide for enhanced operability with respect to adjustability by allowing components that are typically coupled to the seating assembly 10 to be lifted to provide space within the vehicle 12 or lowered to provide a strong reinforcement structure for enhanced occupant experience when seated.

Referring to FIGS. 1-11, the seating assembly 10 for the vehicle 12 includes a seat base 14 having a seat base frame 16. The seat base frame 16 includes a front portion 18 and a rear portion 20. At least one linkage assembly 22 may be rotatably coupled to a bar assembly 24 and may be operable between a deployed state and a stowed state. The at least one linkage assembly 22 includes a first linking portion 26 having first opposing side links 28*a*, 28*b* and a second linking portion 30 having second opposing side links 32*a*, 32*b*. The first opposing side links 28*a*, 28*b* are operably coupled to the second opposing side links 32*a*,32*b*. A linking member 34 may be operably coupled to the bar assembly 24, where the linking member 34 is configured to rotate about the bar assembly 24. A connector link 36 may be operably coupled to the second opposing side links 32*a*,32*b* of the second linking portion 30.

Referring to FIG. 1, the vehicle 12, such as a wheeled motor vehicle, is generally illustrated having a vehicle body 52 defining a cabin interior, also referred to as a passenger compartment 56. The passenger compartment 56 generally includes multiple seating assemblies. The seating assemblies may be arranged in at least one of a first seating row 58 and a second seating row 60. The first seating row 58 is disposed in a vehicle-forward portion of the vehicle 12 and the second seating row 60 is disposed in a vehicle-rearward portion of the vehicle 12. It is contemplated that the seating assemblies may be disposed between the defined seating rows (e.g., the first and second seating rows 58, 60) without departing from the teachings herein. Additionally, it is contemplated that the vehicle 12 may not include the second seating row 60 or may include additional seating rows without departing from the teachings herein.

The vehicle body 52 includes vertical supports, generally referred to as pillars. In the illustrated example depicted in FIG. 1, the pillars include a front support pillar 62, a middle support pillar 64, and a rear support pillar 66. The first seating row 58 is generally disposed between the front support pillar 62 and the middle support pillar 64, while the second seating row 60 is generally disposed between the middle support pillar 64 and the rear support pillar 66. Additional or fewer support pillars may be included in the vehicle 12 without departing from the teachings herein. Additionally, the vehicle 12 is illustrated as a truck, however, the vehicle 12 may be a sedan, sport utility vehicle, a van, a truck, a crossover, or another style vehicle. The vehicle 12 may be a manually operated vehicle (e.g., with a human driver), a fully autonomous vehicle (e.g., no human driver), or a partially autonomous vehicle (e.g., may be operated with or without a human driver). The vehicle 12 may be utilized for personal and/or commercial purposes, such as for ride-providing services (e.g., chauffeuring) and/or ride-sharing services.

The seating assembly 10 generally includes the seat base 14 and a seatback 70 that supports a headrest 72 thereon. The seatback 70 may be pivotably coupled with the seat base 14, such that the seatback 70 can be moved between upright and inclined positions, however, it is contemplated that the seatback 70 may be fixed in the upright position. The seat base 14 includes the seat base frame 16 having the front portion 18 and the rear portion 20. The front portion 18 of the seat base frame 16 is disposed proximate the vehicle-forward portion of the vehicle 12 relative to the rear portion 20 of the seat base frame 16 disposed proximate the vehicle-rearward portion of the vehicle 12 when the linkage assembly 22 is in the deployed state. When the linkage assembly 22 is in the stowed state, the front portion 18 and the rear portion 20 of the seat base frame 16 may be parallel to one another and vertically displaced from each other, where the front portion 18 is higher than the rear portion 20. Additionally, the seat base frame 16 may be generally constructed from strong, rigid materials including, but not limited to, metal tubing or molded plastics and may be operably coupled to a vehicle floor 74 via the linkage assembly 22, as is further described herein.

Figure 2:
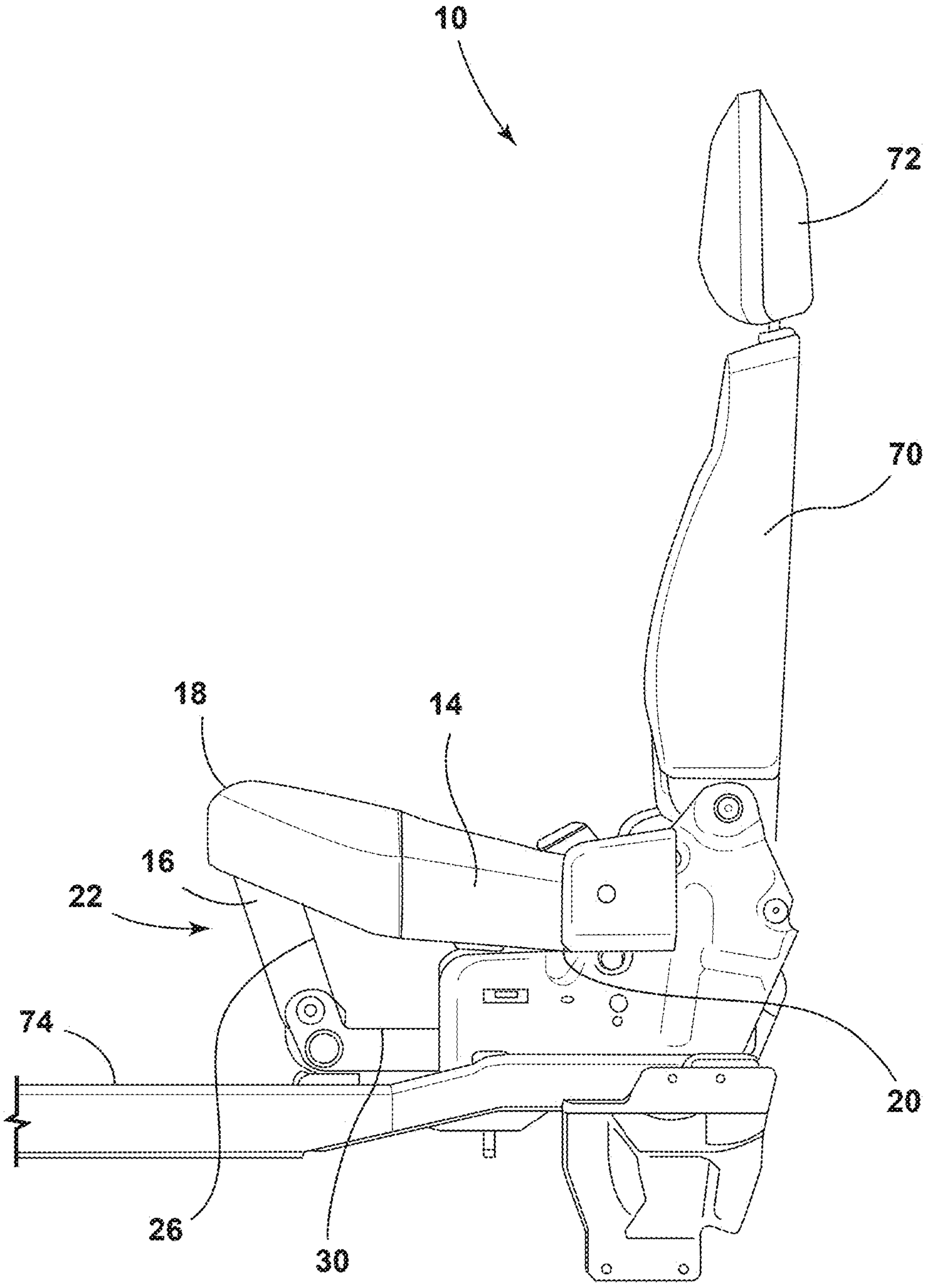
FIG. 2 is a side plan view of a seating assembly including a seat base coupled to a seatback, according to one aspect of the present disclosure.

Referring still to FIGS. 1 and 2, in some implementations, the second seating row 60 of the vehicle 12 may be disposed adjacent to a rear wall 78 of the passenger compartment 56, extending between opposing pillars of the rear support pillar 66. For example, the second seating row 60 can include a first seatback 80 coupled to a first seat base 82 having a first headrest 84. The second-row seating assembly can also include a second seatback 86 coupled to a second seat base 88. The second seatback 86 can include a first portion 90 having a second headrest 92 and a second portion 94 having a third headrest 96. The first and second portion 90, 94 of the second seatback 86 can be integrally coupled forming a uniform seatback.

Figure 3:
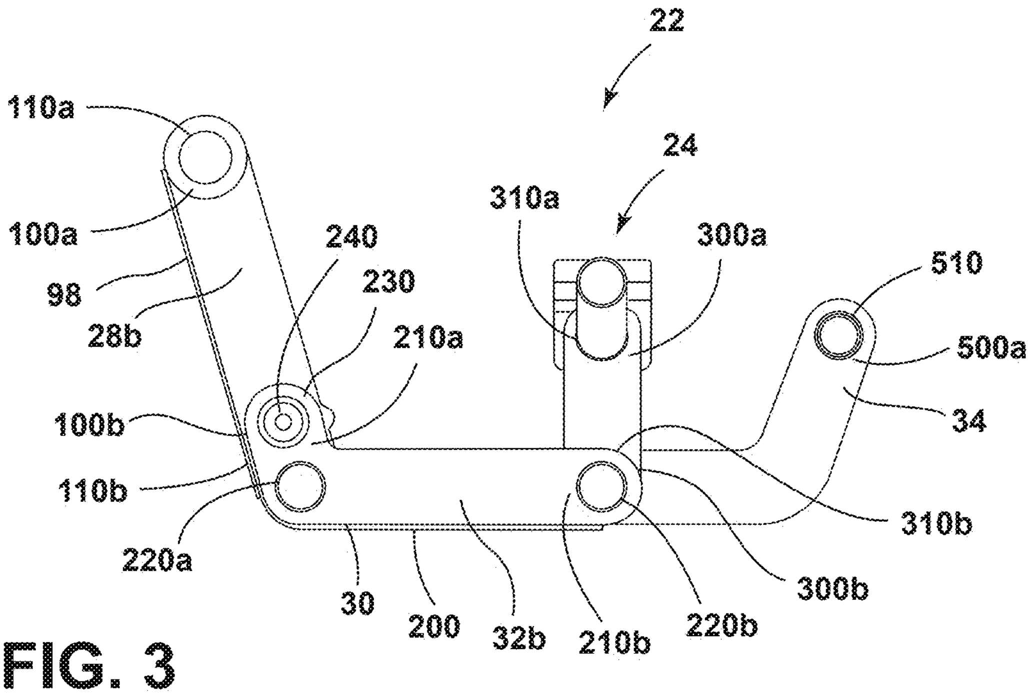
FIG. 3 is side plan view of a linkage assembly in a deployed state, according to one aspect of the present disclosure.
Figure 4:
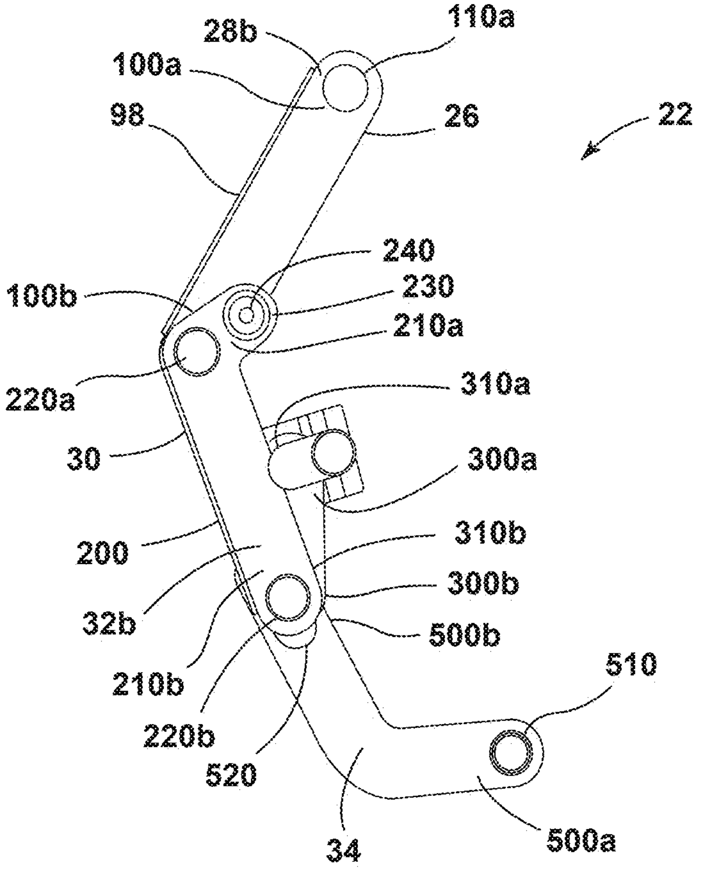
FIG. 4 is a side plan view of a linkage assembly in a stowed state, according to one aspect of the present disclosure.

Referring now to FIGS. 3 and 4, The seating assembly 10 includes the at least one linkage assembly 22 that may be rotatably coupled to the bar assembly 24. The linkage assembly 22 is operable between the stowed state (FIG. 3) and the deployed state (FIG. 4). When in the deployed state, the linkage assembly 22 is configured to position the seat base 14 parallel to and horizontal relative to the vehicle floor 74 in a position suitable for the occupant to be seated, allowing the seat base 14 to be positioned in the stowed state for use by the occupant when desired. When in the stowed state, the linkage assembly 22 is configured to position the seat base 14 in an upward, raised orientation relative to the vehicle floor 74, vertically displacing the front portion 18 of the seat base frame 16 of the seat base 14 higher than the rear portion 20 of the seat base frame 16 relative to the vehicle floor 74, allowing the seat base 14 to create additional floor space when not in use by the occupant.

Figure 5:
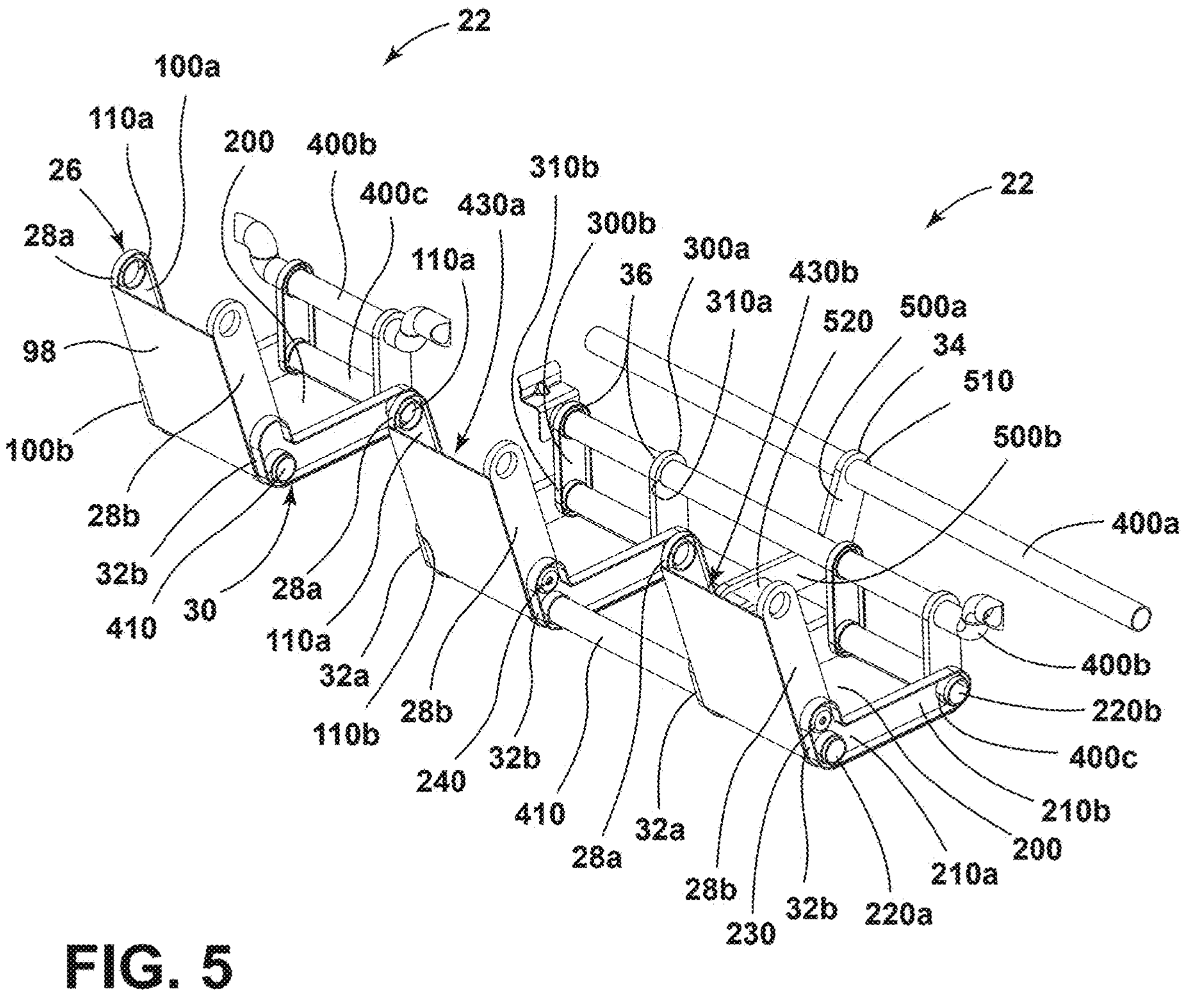
FIG. 5 is a side perspective view of multiple linkage assemblies coupled to a bar assembly.
Figure 6:
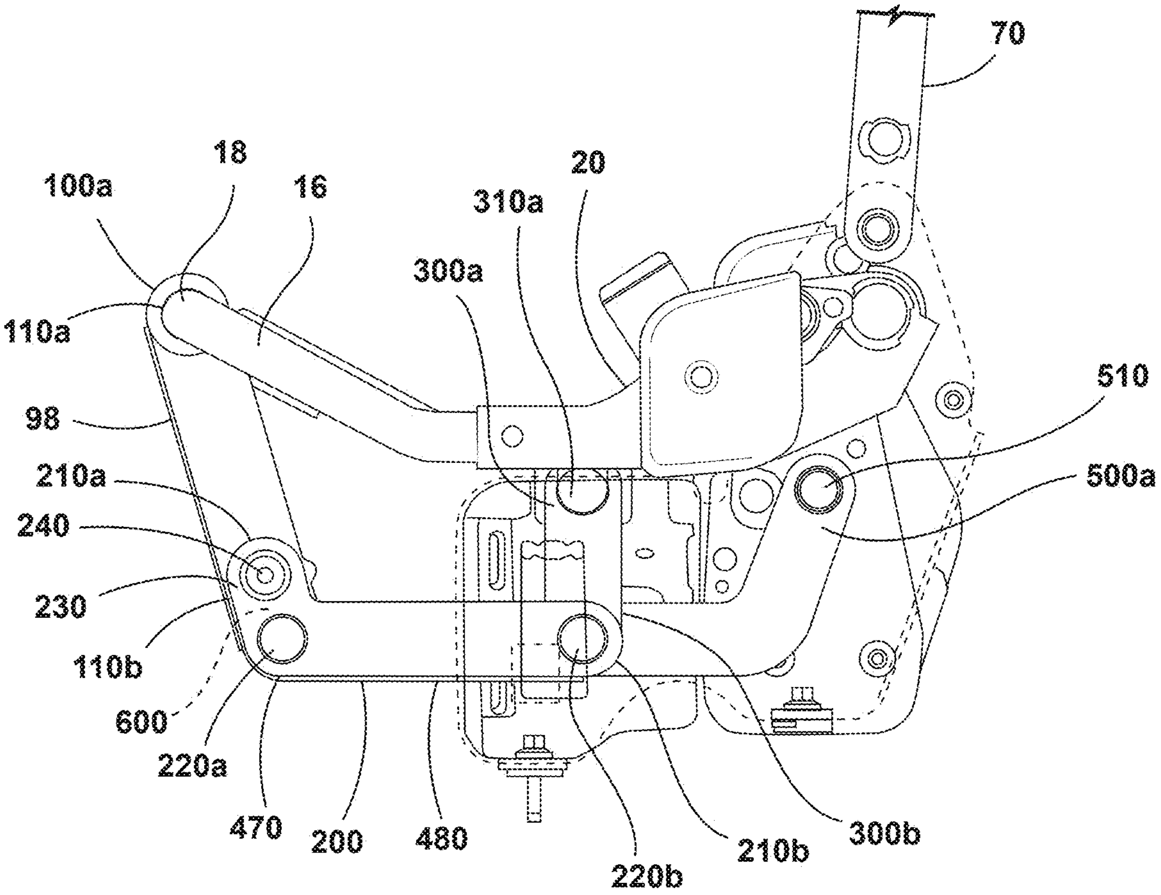
FIG. 6 is a side plan view of a linkage assembly coupled to a seat base frame of a seating assembly for a vehicle, according to one aspect of the present disclosure.

Referring to FIGS. 5 and 6, the linkage assembly 22 includes the first linking portion 26 having first opposing side links 28*a*, 28*b*. The first opposing side links 28*a*, 28*b* of the first linking portion 26 define a retention member 98 extending along a length of the first opposing side links 28*a*, 28*b* therebetween to assist in reinforcement of the seating assembly 10 when in use by the occupant. The retention member 98 comprises a rigid, generally rectangular or square cross-section structure that may be constructed from materials including, but not limited to, a high-strength metallic material such as steel or aluminum. The retention member 98 is fixedly coupled with the first opposing side links 28*a*, 28*b*, for example, by welding, bolting or by other fastening mechanisms. The retention member 98 provides reinforcement to the first linking portion 26 and maintains a parallel, spaced-apart relationship of the first opposing side links 28*a*, 28*b* when the seating assembly 10 is in use and under load from the occupant to transfer loads from the seat base 14 into the linkage assembly 22.

The first opposing side link includes a first end 100*a* and a second end 100*b*. The first end 100*a* defines a first aperture 110*a* configured to couple to the front portion 18 of the seat base frame 16, and the second end 100*b* defines a second aperture 110*b*. The second aperture 110*b* may be configured to receive pivot connections to pivotably couple the second end 100*b* of the first opposing side links 28*a*, 28*b* to the bar assembly 24. The second end 100*b* may abut the second linking portion 30 at a pivot coupling location, as is further described herein. The retention member 98 bridging the first opposing side links of the first linking portion 26 may reduce splaying and maintains the parallel, reinforced configuration of the first linking portion 26 as it pivots and folds between the stowed state and the deployed state.

Referring still to FIGS. 5 and 6, the linkage assembly 22 includes the second linking portion 30 having second opposing side links 32*a*,32*b*. The second opposing side links 32*a*,32*b* of the second linking portion 30 define a retention member 200 that extends between the second opposing side links 32*a*,32*b* to assist in reinforcement of the seating assembly 10 when in use by the occupant. The retention member 200 includes a rigid, generally rectangular or square cross-section structure may be constructed from materials including, but not limited to metals such as steel or aluminum. The retention member 200 is fixedly coupled between and bridges the second opposing side links 32*a*,32*b* providing reinforcement that maintains the parallel, spaced-apart positioning of the second opposing side links 32*a*,32*b* when the linkage assembly 22 is under load when the occupant is seated when the linkage assembly 22 is in the deployed state.

The second opposing side links 32*a*,32*b* of the second linking portion 30 include a first end 210*a* and a second end 210*b*. The first end 210*a* defines a first aperture 220*a* and the second end 210*b* defines a second aperture 220*b*. The first end 210*a* of the second opposing side links 32*a*,32*b* includes an extension portion 230 defining an opening 240 configured to receive a pin 250. The pin 250 assists in reducing the linkage assembly 22 from over-extension beyond a predetermined range of motion when in the stowed state, and assists in structurally supporting the linkage assembly 22 when in the deployed state. The first end 210*a* of the second opposing side links 32*a*,32*b* may be coupled to the bar assembly 24 with the first end 210*a* of the second linking portion 30 abutting the second end 100*b* of the first linking portion 26 and the second end 210*b* of the second linking portion 30 abutting the connector link 36. Accordingly, the first opposing side links 28*a*, 28*b* of the first linking portion 26 defining the retention member 98 and the second opposing side links 32*a*,32*b* of the second linking portion 30 defining the retention member 200 generally form a bin-like structure that provides high strength and rigidity to support the seat base 14 and occupant loads when the linkage assembly 22 is in the deployed state. For example, the first seatback 80 may include a single bin-like structure formed by the linkage assembly 22. The first portion 90 and the second portion 94 of the second seatback 86 may each include a bin-like structure formed by the linkage assembly 22 coupled via the bar assembly 24, as is further described herein.

Referring now to FIGS. 3-6, the linkage assembly 22 includes the connector link 36 that may be coupled to the bar assembly 24 abutting the second end 210*b* of the second linking portion 30. The connector link 36 includes a first end 300*a* and a second end 300*b* that may be coupled to the bar assembly 24. When the linkage assembly 22 is in the deployed state with the seat base 14 positioned for occupant seating, the connector link 36 may be positioned in a generally vertical orientation. The vertical positioning of the connector link 36 assists in forming a support strut to transfer loads from the seat base 14 through the second linking portion 30 and into the bar assembly 24 and vehicle floor 74. Furthermore, the vertical positioning of the connector link 36 may be configured to assist in stabilizing the overall geometry of the linkage assembly 22 by enhancing the rigidity of the seat base 14. When transitioning to the stowed state, the connector link 36 assists in providing additional extension to the linkage assembly 22 to maintain a close proximity to the seat base 14. Additionally, the first end 300*a* and the second end 300*b* of the connector link 36 define openings 310*a*, 310*b* to receive the bar assembly 24.

Referring to the illustrated configuration depicted in FIG. 5, the various components of the linkage assembly 22 may be coupled through a variety of configurations of the bar assembly 24. The bar assembly 24 may include a plurality of bars configured to assist in coupling the various components of the linkage assembly 22. For example, the bar assembly 24 may include a first bar 400*a*, a second bar 400*b*, and a third bar 400*c*. In some implementations, the opening 310*a* of the first end 300*a* of the connector link 36 is configured to receive the second bar 400*b* of the bar assembly 24 and the opening 310*b* of the second end 300*b* of the connector link 36 is configured to receive the third bar 400*c*. Similarly, the second aperture 220*b* of the second linking portion 30 is configured to receive the third bar 400*c*. Additionally, the linking member 34 may be coupled to the first bar 400*a* and the third bar 400*c*, as is further described herein. It is contemplated that the bar assembly 24 may utilize a reduced number of bars when constructing the linkage assembly 22, while maintaining the structural integrity of the seating assembly 10.

The bar assembly 24 may include additional bars 410 that may assist in providing structural support to the linkage assembly 22. For example, bar 410 may be used to couple more than one linkage assembly 22 to each other. As illustrated in FIG. 6, the second aperture 110*b* of the first linkage portion and the first aperture 220*a* of the second linkage portion may be aligned to receive the bar. In the present implementation, the linkage assemblies are positioned on opposing ends of the bar and may be positioned equidistant from one another to assist in forming the first seat base 82 and the second seat base 88 of the second seating assembly. The seating assembly 10 may include the second seating assembly that may have multiple linkage assemblies 430*a*, 430*b*. Additionally, bar 410 may be used to couple the second end 100*b* of the first linking portion 26 and the first end 210*a* of the second linking portion 30. Accordingly, the additional bar 410 may be received by the second aperture 110*b* of the second end 100*b* of the first linking portion 26 and the first aperture 220*a* of the first end 210*a* of the second linking portion 30 to provide structural support for the linkage assembly 22.

Figure 7:
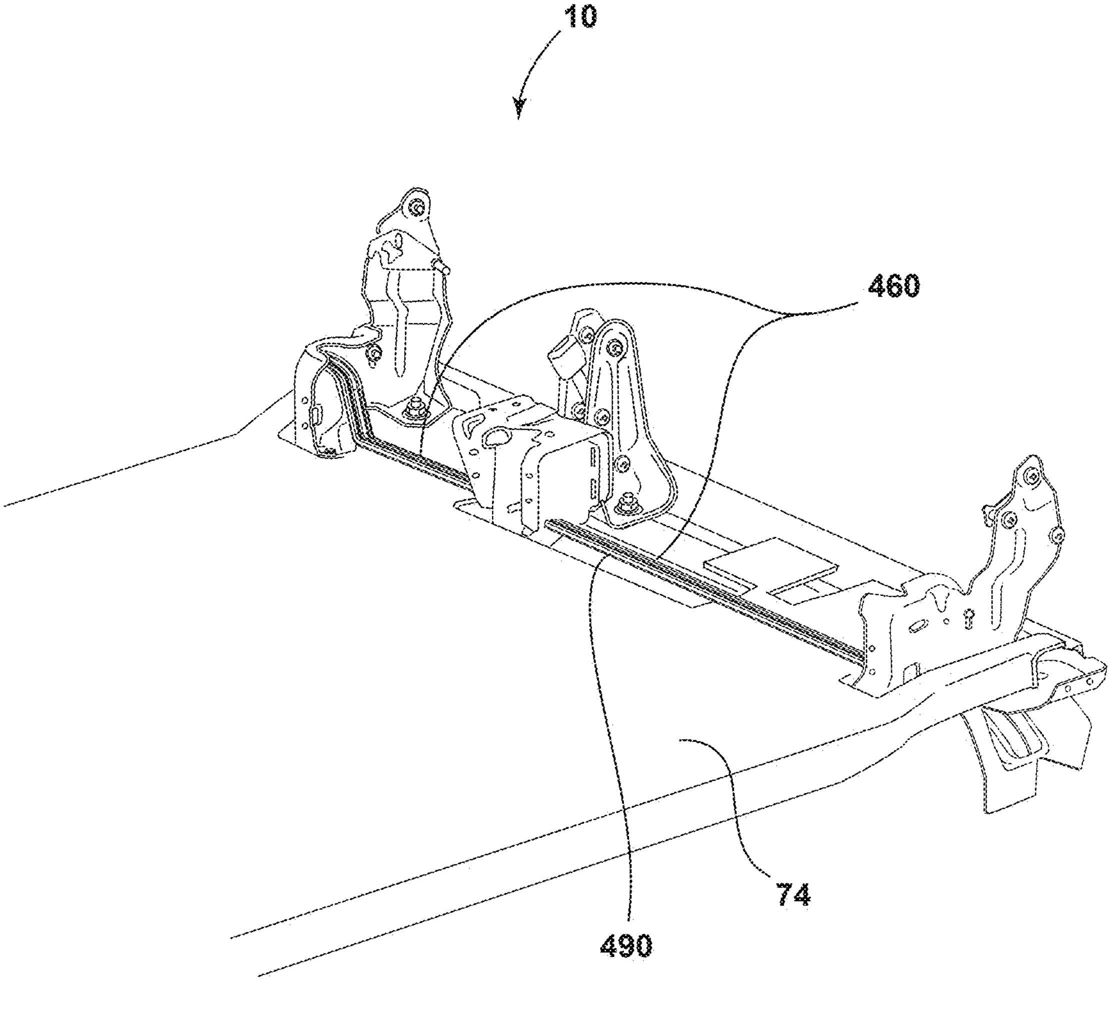
FIG. 7 is a side perspective view of a vehicle floor with a support structure coupled thereto, according to one aspect of the present disclosure.

Referring to FIG. 7, the seating assembly 10 includes a support structure 460 extending along the vehicle floor 74. The support structure 460 may be a generally continuous cross member that extends along a full width of the vehicle floor 74, or may extend partially along the vehicle floor 74 to receive the linkage assembly 22. For example, when the linkage assembly 22 is in the deployed state, surface 470 of the second opposing side links 32*a*,32*b* proximate the second end 210*b* and surface 480 of the retention member 200 of the second linking portion 30 abut and rest atop surface 490 of the support structure 460. The support structure 460 provides a firm, level base for the linkage assembly 22 to be positioned proximate the vehicle floor 74 when in the deployed position to reduce wearing of the vehicle floor 74 over time. Accordingly, surface 490 of the of the support structure 460 may include low friction coatings or padding to reduce friction or motion of the linkage assembly 22 when the occupant is seated or when the vehicle 12 is in motion.

Figure 8:
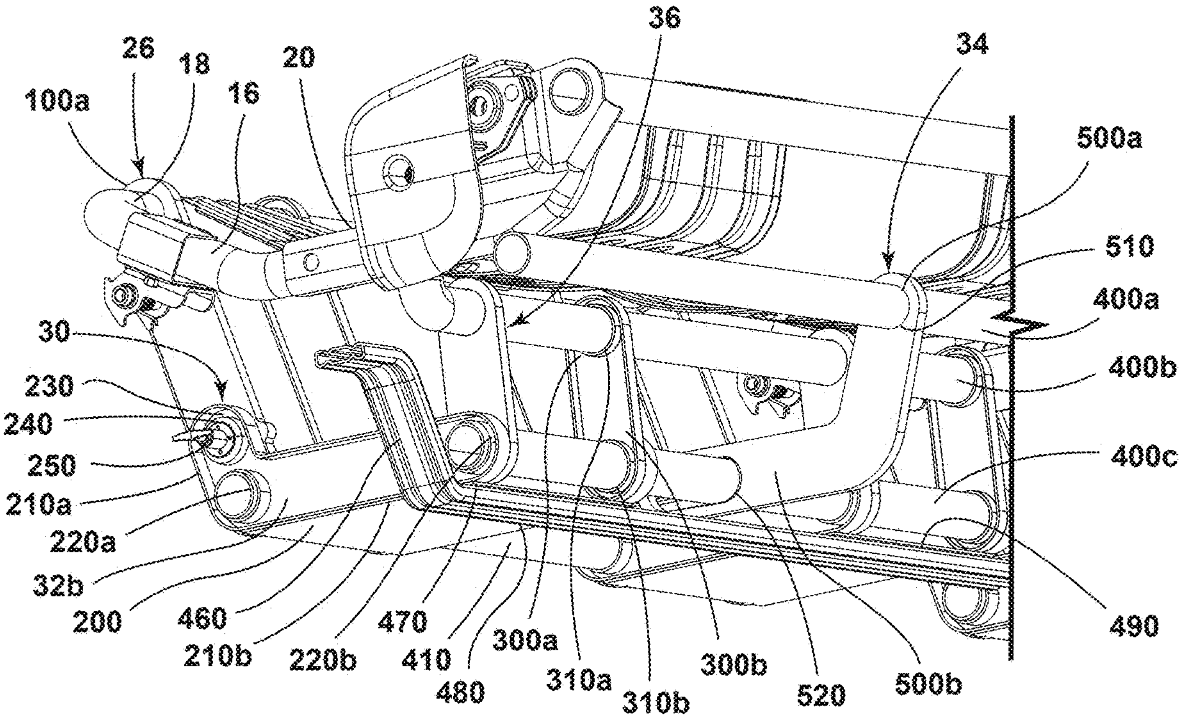
FIG. 8 is a rear perspective view of a linking member of a linkage assembly of a seating assembly, according to one aspect of the present disclosure.

Referring now to FIG. 8, the linkage assembly 22 may include the linking member 34 coupled to the first and third bar 400*c* of the bar assembly 24. The linking member 34 has a generally L-shaped profile with a first end 500*a* and a second end 500*b*. The first end 500*a* defines an opening 510 and the second end 500*b* defines an elongated opening 520. The first end 500*a* of the linking member 34 may be pivotally coupled to the first bar 400*a* of the bar assembly 24 via the opening 510 and the second end 500*b* may be coupled to the third bar 400*c* of the bar assembly 24 via the elongated opening 520. The elongated opening 520 may provide space for the third bar 400*c* to travel along the length of the elongated opening 520 when the linkage assembly 22 is transitioning between the stowed state and the deployed state. When in the deployed state, the linking member 34 assists in fixing the linkage assembly 22 firmly in place to reduce motion of the linkage assembly 22 in a vehicle-rearward direction when the occupant is seated. As the linkage assembly 22 transitions to the stowed state, the linking member 34 is pulled in a vehicle-forward direction assisting in extending the first and second linking portions 26, 30 upward toward the seat base 14 of the seating assembly 10.

Figure 9:
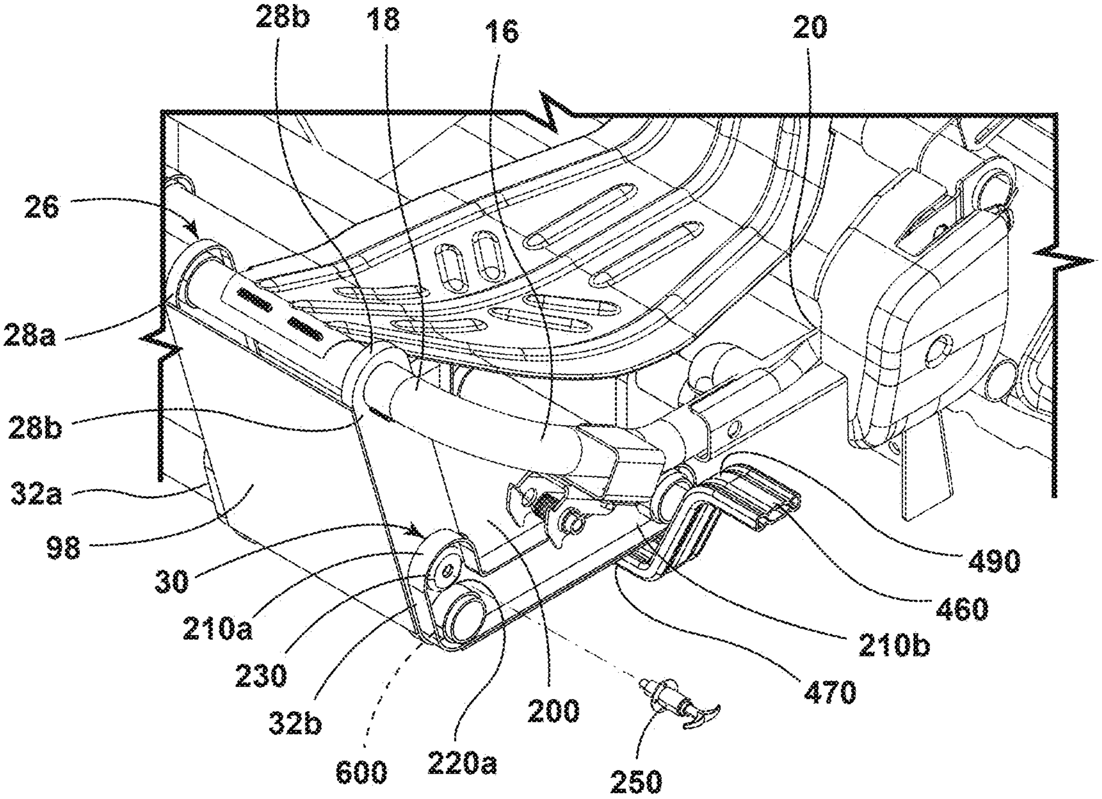
FIG. 9 is an exploded view of a pin configured to be received by opposing side links of a first linking portion and a second linking portion of a linkage assembly, according to one aspect of the present disclosure.

Referring to FIG. 9, during manufacture of the seating assembly 10, the first end 100*a* of the first linking portion 26 may be coupled to the front portion 18 of the seat base frame 16. The second end 100*b* of the first linking portion 26 may be coupled to the additional bar 410 of the bar assembly 24 and abuts the first end 210*a* of the second linking portion 30. The second end 100*b* of the first linking portion 26 and the first end 210*a* of the second linking portion 30 may be coupled to form an engagement point 600 or pivot point that enables an upward pivotable rotation about the bar 410 towards the seatback 70 of the seating assembly 10. In some implementations, the extension portion 230 of the second linking portion 30 defines the opening 240 and the first linking portion 26 may define an opening. The opening of the first linking portion 26 and the opening 240 of the second linking portion 30 may align to receive the pin 250 at the engagement point 600. Accordingly, in operation, as the front portion 18 of the seat base frame 16 and seat base 14 are extended upward when transitioning from the deployed state to the stowed state, the engagement point 600 allows multi-axis rotation of the first and second linking portions 26, 30 about the bar 410 with a predetermined extension range. When in the fully stowed state, the pin 250 assists in reducing overextension of the first linking portion 26 in the vehicle-forward direction. Alternatively, when in the fully deployed state, the pin 250 assists in minimizing over extension of the linkage assembly 22 in the vehicle-forward direction when the occupant is seated.

Figure 10:
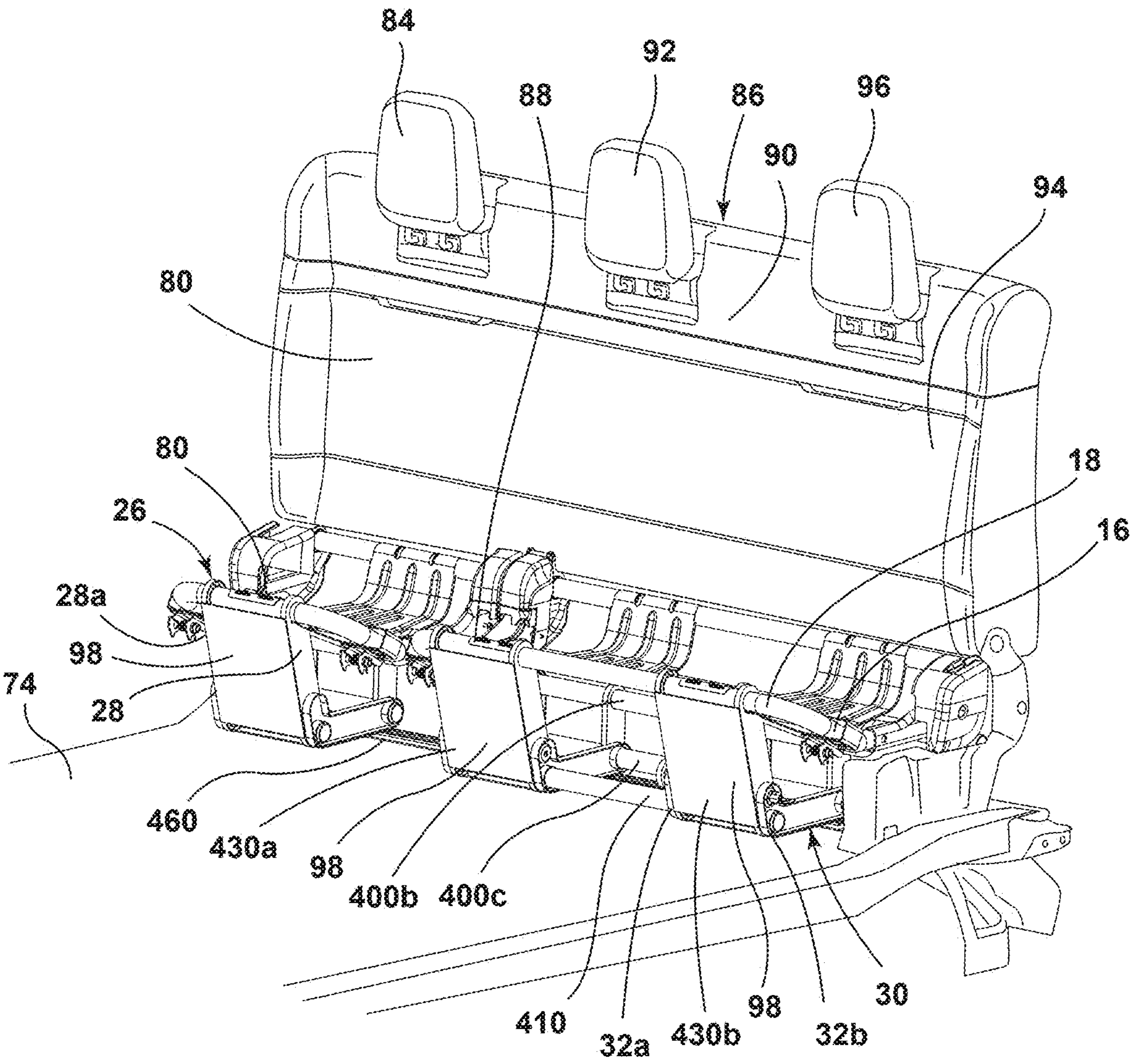
FIG. 10 is a side perspective view of a linkage assembly of a seating assembly in a deployed state, according to one aspect of the present disclosure.
Figure 11:
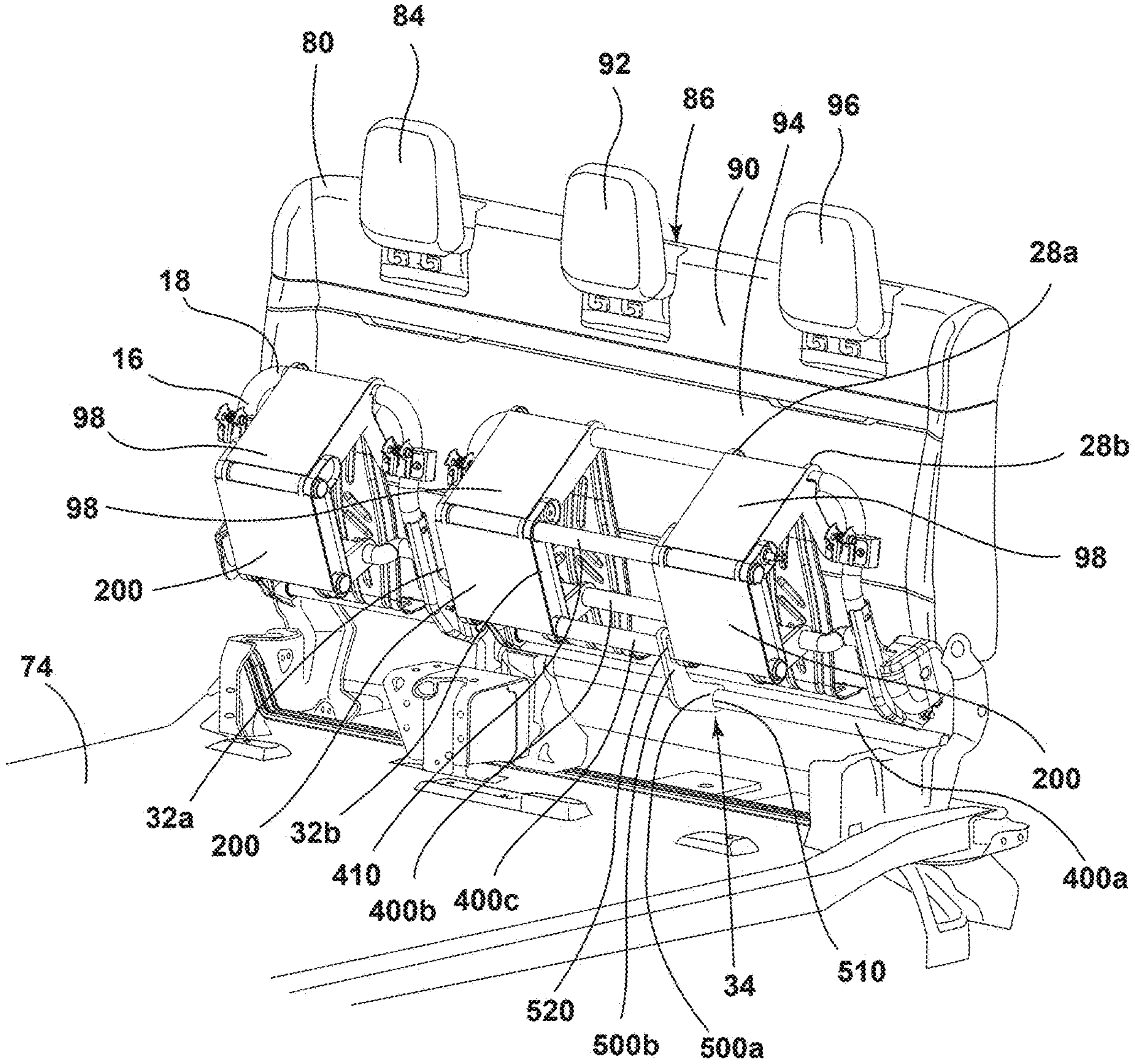
FIG. 11 is a side perspective view of a linkage assembly of a seating assembly in a stowed state, according to one aspect of the present disclosure.

Referring now to FIGS. 10 and 11, the synchronized rotation and extension of the linkage assembly 22 assists in providing a controlled lifting motion to raise the front portion 18 of the seat base frame 16 to the stowed state towards the seatback. In operation, as the occupant initially lifts the front of the seat base frame 16, the first end 300*a* of the connector link 36 of the linkage assembly 22 begins rotation about the second bar 400*b* of the bar assembly 24 moving the second end 300*b* of the connector link 36 in a vehicle-forward direction. Simultaneously, the second end 210*b* of the second linking portion 30 rotates about the third bar 400*c* of the bar assembly 24 to further extend the seat base 14 outward in a vehicle-forward direction and upwards towards the seatback. As the rotation of the connector link 36 and the second linking portion 30 continues, the elongated opening 520 defined by the second end 500*b* of the linking member 34 allows the third bar 400*c* to travel along the length of the elongated opening 520 as the first end 500*a* of the linking member 34 rotates about the first bar 400*a* of the bar assembly 24. The guided displacement of the third bar 400*c* along the length of the elongated opening 520 maximizes the extension of the first and second linking portions 26, 30 assisting the front portion 18 of the seat base frame 16 to fold in close proximity to the seatback 70. Additionally, the pivotal rotation of the first end 500*a* of the linking member 34 about the first bar 400*a* assists in further extending the seat base 14 upward towards the seatback 70 to provide for a thin profile for the seat base 14 when in the fully stowed state.

The linkage assembly 22 may also provide a controlled dropping motion to lower the front portion 18 of the seat base frame 16 to the deployed state. In operation, as the occupant initially lowers the front of the seat base frame 16, the first end 500*a* of the linking member 34 rotates about the first bar 400*a* in a vehicle-rearward position. Simultaneously, the first end 300*a* of the connector link 36 rotates about the second bar 400*b* as the second end 300*b* of the connector link 36 and the second end 210*b* of the second linking portion 30 rotate about the third bar 400*c* in a vehicle-rearward direction. Similarly, the first end 210*a* of the second linking portion 30 and the second end 100*b* of the first linking portion 26 rotate around the additional bar 410 driving the linkage assembly 22 towards the support structure 460 disposed along the vehicle floor 74. When in the deployed state, surface 470 of the second linking portion 30 and surface 480 of the retention member 200 are positioned on surface 490 of the support structure 460 to reduce damage to the vehicle floor 74.

Referring still to FIGS. 10 and 11, in some implementations, it is contemplated that various components of the linkage assembly 22 (i.e., first and second linking portions 26, 30, connector link 36, linking member 34) may be configured to rotate about each respective pivot point on the bar assembly 24 in a simultaneous, synchronized motion. This allows for a singular, fluid extension of the linkage assembly 22 as the front portion 18 of the seat base frame 16 is stowed towards the seatback. For example, the linking member 34, connector link 36, and first and second linking portions 26, 30 begin rotation about the respective bars (i.e., first bar 400*a*, second bar 400*b*, third bar 400*c*) of the bar assembly 24, simultaneously. The rotation rates and paths of each component of the linkage assembly 22 allow for a unified, continuous transition to, from, and between the stowed state and the deployed state.

In other implementations, it is contemplated that linkage assembly 22 may be operable to, from, and between the stowed state and the deployed state through an incremental extension along an arcuate path to operate between the deployed state or the stowed state. For example, the initial lifting of the front portion 18 of the seat base frame 16 first drives the rotation of the first end 300*a* and the second end 300*b* of the connector link 36 about the second bar 400*b* and the third bar 400*c*, respectively. As the connector link 36 rotates through a predetermined arc segment, the connector link 36 drives a corresponding incremental extension of the second linking portion 30. Once the arcuate increment is reached, the first end 500*a* and second end 500*b* of the linking member 34 rotates about the first bar 400*a* and the third bar 400*c*, respectively, allowing a subsequent arcuate increment of deployment extension for the first and second linking portions 26, 30. The arcuate increments may continue with each component of the linkage assembly 22 pivoting through scheduled arcs of rotational travel to lift the seat base 14 towards the seatback 70, in the stowed state, or to lower the seat base 14 towards the vehicle floor 74, in the deployed state. The incremental staging of the linkage assembly 22 provides a more controlled deployment and stowing states to increase efficiency, precision, and control of the movement of the linkage assembly 22.

Use of the present assembly may provide for a variety of advantages. For example, the linkage assembly 22 may provide for a thin profile when in the stowed state to allow the occupant access to more space along the vehicle floor 74. Additionally, when the linkage assembly 22 is in the deployed state, the seating assembly 10 may be reinforced by the retention members 98, 200 of the first and second linking portions 26, 30, respectively, forming a bin-like structure that provides high strength and rigidity to support the seat base 14 and occupant loads when the occupant is seated. The synchronized motion of the linkage assembly 22 during stowing and deployment, enables a smooth and controlled movement of the seat base 14. Further, the design and structural composition of the linkage assembly 22 may be manufactured in a cost-effective manner while providing the desired operability and structured reinforcement.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly for a vehicle, comprising:

a seat base including a seat base frame, wherein the seat base frame includes a front portion and a rear portion;

a support frame operably coupled to the seat base, wherein the support frame includes a bar assembly, wherein the bar assembly includes a first bar, a second bar, and a third bar; and at least one linkage assembly rotatably coupled to the bar assembly and operable between a deployed state and a stowed state, the at least one linkage assembly including:

a first linking portion including first opposing side links;

a second linking portion including second opposing side links, wherein the first opposing side links are operably coupled to the second opposing side links;

a linking member operably coupled to the bar assembly, wherein the linking member is configured to rotate about the bar assembly; and a connector link operably coupled to the second opposing side links of the second linking portion, wherein the linking member includes a first end coupled to the first bar and a second end coupled to the third bar of the bar assembly, and wherein the linking member is configured to rotate about the third bar when the at least one linkage assembly is in the stowed state.

2. The seating assembly of claim 1, wherein a surface of the second opposing side links of the second linking portion is configured to abut a support structure extending along a floor of the vehicle when the at least one linkage assembly is in the deployed state.

3. The seating assembly of claim 1, wherein the first opposing side links include a first end and a second end, and wherein the second opposing side links include a first end and a second end.

4. The seating assembly of claim 3, wherein the second end of the first opposing side links are operably coupled to the first end of the second opposing side links.

5. The seating assembly of claim 3, wherein the first end of the first opposing side links is coupled to the front portion of the seat base frame.

6. The seating assembly of claim 1, wherein the second opposing side links include an extension portion defining an aperture.

7. The seating assembly of claim 6, wherein a pin extends through the aperture of the extension portion of the second opposing side links of the second linking portion.

8. The seating assembly of claim 1, wherein the connector link includes a first end and a second end, and wherein the first end of the connector link is operably coupled to the second bar and the second end of the connector link is coupled to the third bar.

9. The seating assembly of claim 8, wherein the second end of the connector link abuts the second end of the second opposing side links of the second linking portion.

10. A seating assembly for a vehicle, comprising:

a seat base including a seat base frame, wherein the seat base frame includes a front portion and a rear portion;

a support frame operably coupled to the seat base, wherein the support frame includes a bar assembly; and at least one linkage assembly rotatably coupled to the bar assembly and operable between a deployed state and a stowed state, the at least one linkage assembly including:

a first linking portion including first opposing side links;

a second linking portion including second opposing side links, wherein the first opposing side links are operably coupled to the second opposing side links;

a linking member operably coupled to the bar assembly, wherein the linking member is configured to rotate about the bar assembly; and a connector link operably coupled to the second opposing side links of the second linking portion, wherein the at least one linkage assembly includes a first retention member extending between the first opposing side links and a second retention member extending between the second opposing side links configured to reinforce the at least one linkage assembly.

11. A seating assembly for a vehicle, comprising:

a seat base;

a bar assembly; and at least one linkage assembly operably coupled to the bar assembly, wherein the at least one linkage assembly is operable between a deployed state and a stowed state, the at least one linkage assembly including:

a first linking portion including first opposing side links;

a second linking portion including second opposing side links, the first opposing side links operably coupled to the second opposing side links at an engagement point;

a pin extending through an aperture defined at the engagement point of the first linking portion and the second linking portion;

a first retention member extending between the first opposing side links; and a second retention member extending between the second opposing side links, wherein the first and second retention members are configured to reinforce the at least one linkage assembly.

12. The seating assembly of claim 11, further comprising:

a linking member operably coupled to the bar assembly configured to rotate about the bar assembly.

13. The seating assembly of claim 11, further comprising:

a connector link operably coupled to the second opposing side links of the second linking portion.

* * * * *